US009154814B2

(12) United States Patent
Luthra

(10) Patent No.: US 9,154,814 B2
(45) Date of Patent: Oct. 6, 2015

(54) METHOD AND APPARATUS FOR CONVERTING TWO-DIMENSIONAL VIDEO CONTENT FOR INSERTION INTO THREE-DIMENSIONAL VIDEO CONTENT

(75) Inventor: Ajay K. Luthra, San Diego, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 680 days.

(21) Appl. No.: 13/042,064

(22) Filed: Mar. 7, 2011

(65) Prior Publication Data
US 2011/0216164 A1 Sep. 8, 2011

Related U.S. Application Data

(60) Provisional application No. 61/311,084, filed on Mar. 5, 2010.

(51) Int. Cl.
H04N 13/00 (2006.01)
H04N 21/2343 (2011.01)
(Continued)

(52) U.S. Cl.
CPC ..... H04N 21/23439 (2013.01); H04N 13/0029 (2013.01); H04N 13/0048 (2013.01);
(Continued)

(58) Field of Classification Search
CPC . H04N 13/0029; H04N 13/026; H04N 21/84; H04N 21/44016; H04N 21/44029; H04N 21/23424
USPC .......................................................... 348/43
See application file for complete search history.

(56) References Cited

U.S. PATENT DOCUMENTS

2004/0027267 A1 2/2004 Rousso
2006/0279750 A1 12/2006 Ha
(Continued)

FOREIGN PATENT DOCUMENTS

CN 1126344 A 7/1996
CN 1893653 A 1/2007
(Continued)

OTHER PUBLICATIONS

Redert A et al: "ATTEST: advanced three-dimensional television system technologies", 3D Data Processing Visualization and Transmission, 2002. Proceedings. First International Symposium on Jun. 19-21, 2002, Piscataway, NJ, USA, IEEE, Los Alamitos, CA, USA, Jun. 19, 2002, pp. 313-319.
(Continued)

Primary Examiner — William C Vaughn, Jr.
Assistant Examiner — Naod Belai
(74) Attorney, Agent, or Firm — Lowenstein Sandler LLP

(57) ABSTRACT

A method and apparatus is provided that converts video content from a first format type into a second format type so that the video content can be viewed with other video content that has the second video format type. The method includes determining a first format of a first stream of video content (702) and determining a second format of a second stream of video content (704, 706). The method also includes converting (806, 808) the format of the second stream of video content into the format of the first stream and combining (812) the first stream of video content with the converted second stream of video content to form. In order to display the first and second video content streams the method decodes the combined first and converted second stream of video content using the first format.

17 Claims, 13 Drawing Sheets

(51) Int. Cl.
  *H04N 13/02*   (2006.01)
  *H04N 21/234*  (2011.01)
  *H04N 21/44*   (2011.01)
  *H04N 21/4402* (2011.01)
  *H04N 21/84*   (2011.01)

(52) U.S. Cl.
  CPC ....... *H04N13/026* (2013.01); *H04N 21/23424* (2013.01); *H04N 21/44016* (2013.01); *H04N 21/44029* (2013.01); *H04N 21/84* (2013.01)

(56) References Cited

U.S. PATENT DOCUMENTS

| | | | |
|---|---|---|---|
| 2009/0274391 | A1 | 11/2009 | Arcas et al. |
| 2010/0156932 | A1 | 6/2010 | Hwang et al. |
| 2011/0064262 | A1* | 3/2011 | Chen et al. ............ 382/100 |
| 2011/0175988 | A1 | 7/2011 | Luthra et al. |
| 2011/0216162 | A1 | 9/2011 | Filippini et al. |
| 2012/0026302 | A1 | 2/2012 | Jung |
| 2012/0314029 | A1* | 12/2012 | Boyce et al. ............ 348/43 |

FOREIGN PATENT DOCUMENTS

| | | |
|---|---|---|
| CN | 101636747 A | 1/2010 |
| EP | 1739979 A2 | 1/2007 |
| JP | 2004274125 A | 9/2004 |
| KR | 20020028167 A | 4/2002 |
| WO | 2004008768 A1 | 1/2004 |
| WO | 2006097825 A2 | 9/2006 |
| WO | 2008054100 A1 | 5/2008 |
| WO | 2009048235 A2 | 4/2009 |

OTHER PUBLICATIONS

Brightwell P J et al: "Flexible switching and editing of MPEG-2 video bitstreams", Broadcasting Convention, 1997. IBS 97., International (Conf. Publ. 447) Amsterdam, Netherlands Sep. 12-16, 1997, London, UK, IEE, UK, Sep. 12, 1997, pp. 547-552. Abstract Only.
Hyun Lee et al: "A Structure for 2D/3D Mixed Service Based on Terrestrial DMB System", 3DTV Conference, 2007, IEEE, PI, May 1, 2007, pp. 1-4, Abstract Only.
Patent Cooperation Treaty, International Search Report and Written Opinion of the International Searching Authority for International Application No. PCT/US2011/027410, May 30, 2011, 13 pages.
CN Search Report with English translation for CN Application No. 201180012552.9, mailed Apr. 24, 2014, 4 pages.
CN Search Report with English translation for CN Application No. 201180012552.9, mailed Dec. 30, 2014, 4 pages.

* cited by examiner

METHOD AND APPARATUS FOR CONVERTING TWO-DIMENSIONAL VIDEO CONTENT FOR INSERTION INTO THREE-DIMENSIONAL VIDEO CONTENT

CLAIM OF PRIORITY

This application claims the benefit of U.S. Provisional Patent Application Ser. No. 61/311,084 filed on Mar. 5, 2010, entitled "Inserting 2D and 3D Video Commercials in Half Resolution System," the disclosure of which is incorporated by reference into this patent application in its entirety.

FIELD OF THE INVENTION

The present invention relates to three-dimensional and two-dimensional video content and, in particular, to converting two-dimensional video content into three-dimensional video content and combining the three-dimensional video content with the converted two-dimensional video content.

BACKGROUND

Depth perception for three-dimensional (3D) video content that can be transmitted as a part of 3D TV is provided by capturing two views, one for the left eye and the other for the right eye. These two views are compressed and sent over any of a number of different networks. Alternatively, the two views are stored on a storage medium. A decoder is used to decode the two views and sends the decoded 3D video content for display. Two categories exist to represent and format the two views that are necessary to create the 3D video content. First are the half resolution systems where the two views for the left eye and the right eye are merged together in as signal video frame. These half resolutions include a horizontal 3D format (left and right views), a vertical 3D format (top and bottom views) and a quincunx 3D format (checkerboard views). Second are views that are kept separate with full high definition (HD) resolution for both eyes.

3D video systems, and in particular 3D TV, faces a task of inserting 2D video content into the 3D video content in such a way that permits ease of viewing the 3D and 2D video content. An example of the issue is broadcasting a movie that is filmed and distributed using one of the half resolution 3D formats and inserting into the film a commercial or other type of content that is filmed and distributed using 2D format. If 2D video content is inserted into the 3D video content without anything more, the 3D TV display has to recognize it and change its display mode to 2D. As most 3D display systems require a user to wear 3D glasses, there is also a need for the viewer of video content to take off their glasses in order to view the commercial properly. This can put an unacceptable burden on the viewer as well as on the 3D TV. The 3D TV repeatedly going back in forth to accommodate 3D and 2D video content and the viewer repeatedly taking off and putting on 3D glasses is counterproductive to the viewing pleasure of the 3D and 2D video content.

It is therefore needed to develop a way for the 3D TV to display the 3D content and the 2D content in a manner that does not require the user to constantly take off and put on the 3D glasses while enjoying the 3D and 2D content.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
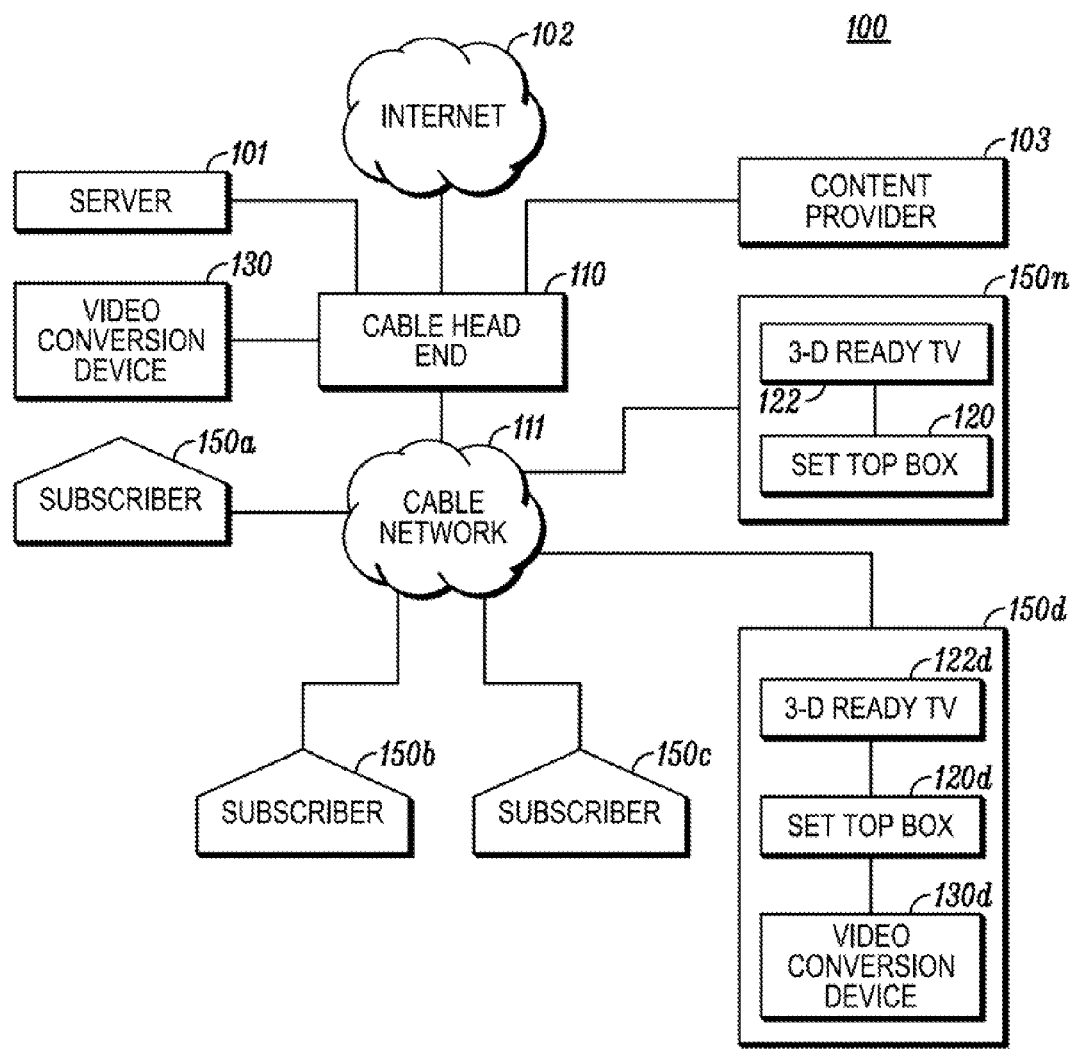
FIG. 1 illustrates network architecture in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to method and apparatus for converting two-dimensional video content into three-dimensional video content that to be inserted into the three-dimensional video content. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of converting two-dimensional video content so that it can be inserted into three-dimensional video content for 3D display described herein. The non-processor circuits may include, but are not limited to, a radio receiver, a radio transmitter, signal drivers, clock circuits, power source circuits, and user input devices. As such, these functions may be interpreted as steps of a method to perform conversion of two-dimensional video content so that it can be displayed with three-dimensional video content. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In accordance with the principles described below, a method is disclosed that converts video content from a first format type into a second format type so that the video content can be viewed with other video content that has the second video format type. The method includes determining a first format of a first stream of video content and determining a second format of a second stream of video content. The method also includes converting the format of the second stream of video content into the format of the first stream and combining the first stream of video content with the converted second stream of video content to form. In order to display the first and second video content streams the method decodes the combined first and converted second stream of video content using the first format. As is understood, the first format is one of the 3D video formats and the second format is 2D video format. In order to combine the video content, the method splices the first video content with converted second video content.

In another embodiment, the disclosed method includes providing 3D video content that uses a determined 3D video format and providing 2D video content. The method continues with converting the 2D video content into 3D video content using the determined 3D video format. The converted 2D video content is spliced into the 3D video content to create a combined 3D video content. The combined 3D video content is then decoded and displayed.

In addition, an apparatus is disclosed that includes a transceiver that transmits and receives 3D video content and 2D video content. The apparatus includes a detector, a converter and a splicer. The detector is used to determine the format type for 3D video content. The converter, which can include a decimator and a copier, converts the 2D video content into the 3D video content using the determined format type. The splicer combines the converted 2D video content with the 3D video content to create a combined 3D video content that can be displayed on a 3D video device.

FIG. 1 illustrates a network architecture 100 in which a video conversion device 130 may be used, according an embodiment. Embodiments of the video conversion devices are described in more detail below. As shown in FIG. 1, the network architecture 100 is illustrated as cable television (CATV) network architecture 100, including a cable head-end unit 110 and a cable network 111. A number of data sources 101, 102, 103, may be communicatively coupled to the cable head-end unit 110 including, but in no way limited to, a plurality of servers 101, the Internet 102, radio signals, or television signals received via a content provider 103. The cable head-end 110 is also communicatively coupled to one or more subscribers 150a-n through a cable network 111.

The conversion device 130 may be used in any network providing an MPEG stream to the STB 120. For instance, the video conversion device 130 may be used in a network providing the 3D video content stream directly to the STB 120. Alternately, the 3D video content stream may comprise Internet Protocol (IP) packets or any packetization scheme configured to transmit the 3D video content stream. The 3D video content stream may be received from a satellite transmission, the Internet or other network. As shown the video conversion device 130 is connected to the cable network 111. In an embodiment shown with subscriber 150d, the video conversion device 130 can be connected to or be a part of the devices located with the subscriber.

In an embodiment, the cable network 111 provides the 3D and 2D video content stream to each of the subscribers 150a-n using, for instance, fixed optical fibers or coaxial cables. The 3D video content stream 139 in this instance may be a QAM modulated stream. Each of the subscribers 150a-n may receive the 3D and 2D video content stream at an STB. For instance, the subscriber 150n may receive the 3D and 2D video content stream at an STB 120. The STB 120 may thereafter decode the 3D video content for display. Further, the cable network 111 is configured to provide a plurality of programs multiplexed together in the subscriber 150n may use the STB 120 to select a program with 3D information. The STB 120 is a device that enables a television set to receive digital television (DTV) broadcasts.

The 3D video stream is a video stream carrying 3D and 2D video content encoded in a format that a decoder is able to decode. The 3D video content may be comprised of multiple related views that required for displaying 3D video content. For instance, the 3D video stream may carry 3D video content that may be decoded to form stereoscopic images comprised of a left eye view and a right eye view. The 3D video stream can be formatted in any of known formatting techniques including vertical, horizontal and quincunx formats. Alternately, the multiple-view stream may carry information that may be decoded to form more than two views. The 3D video stream may also include multiple sub-streams and information related to the depth of the objects in the scene. The subscriber 150n may have a 3D-ready TV 122 capable of displaying 3D stereoscopic views. The STB 120 may include a decoder.

Figure 2:
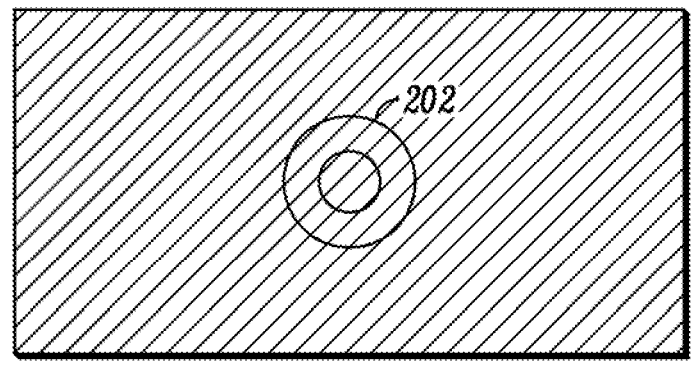
FIG. 2 is a block diagram of 2D video content that is used in connection with some embodiments of the invention.
Figure 3:
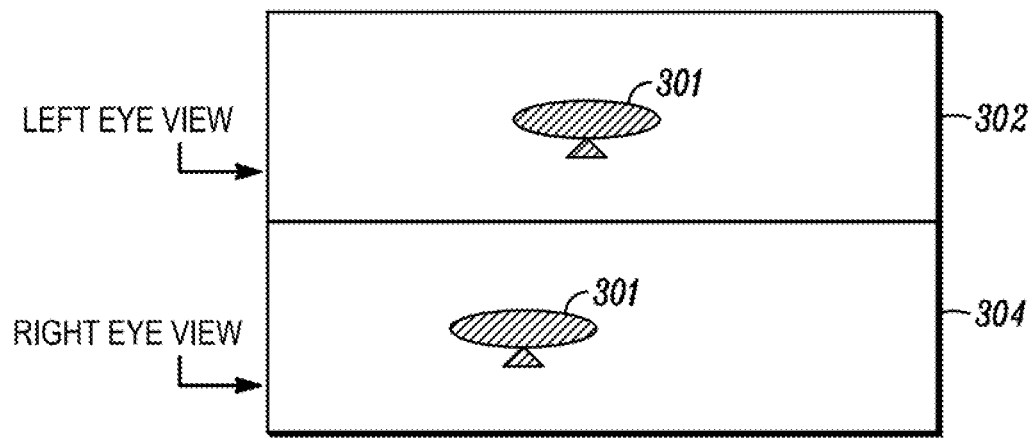
FIG. 3 is a block diagram that illustrates the format of one type of 3D video content that is used in connection with some embodiments of the invention.
Figure 4:
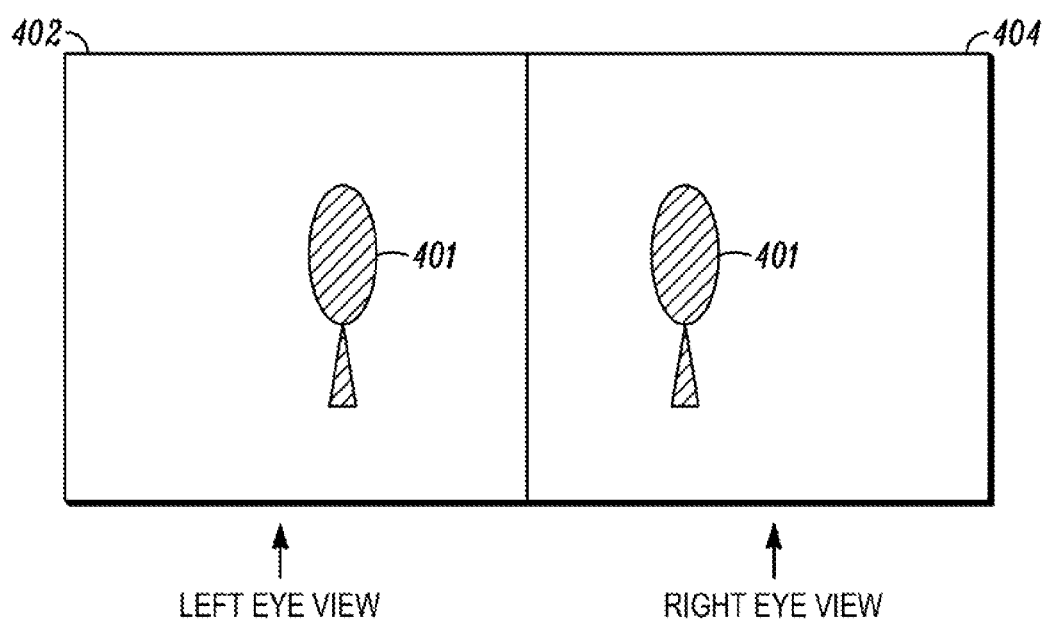
FIG. 4 is a block diagram that illustrates the format of another type of 3D video content that is used in connection with some embodiments of the invention.
Figure 5:
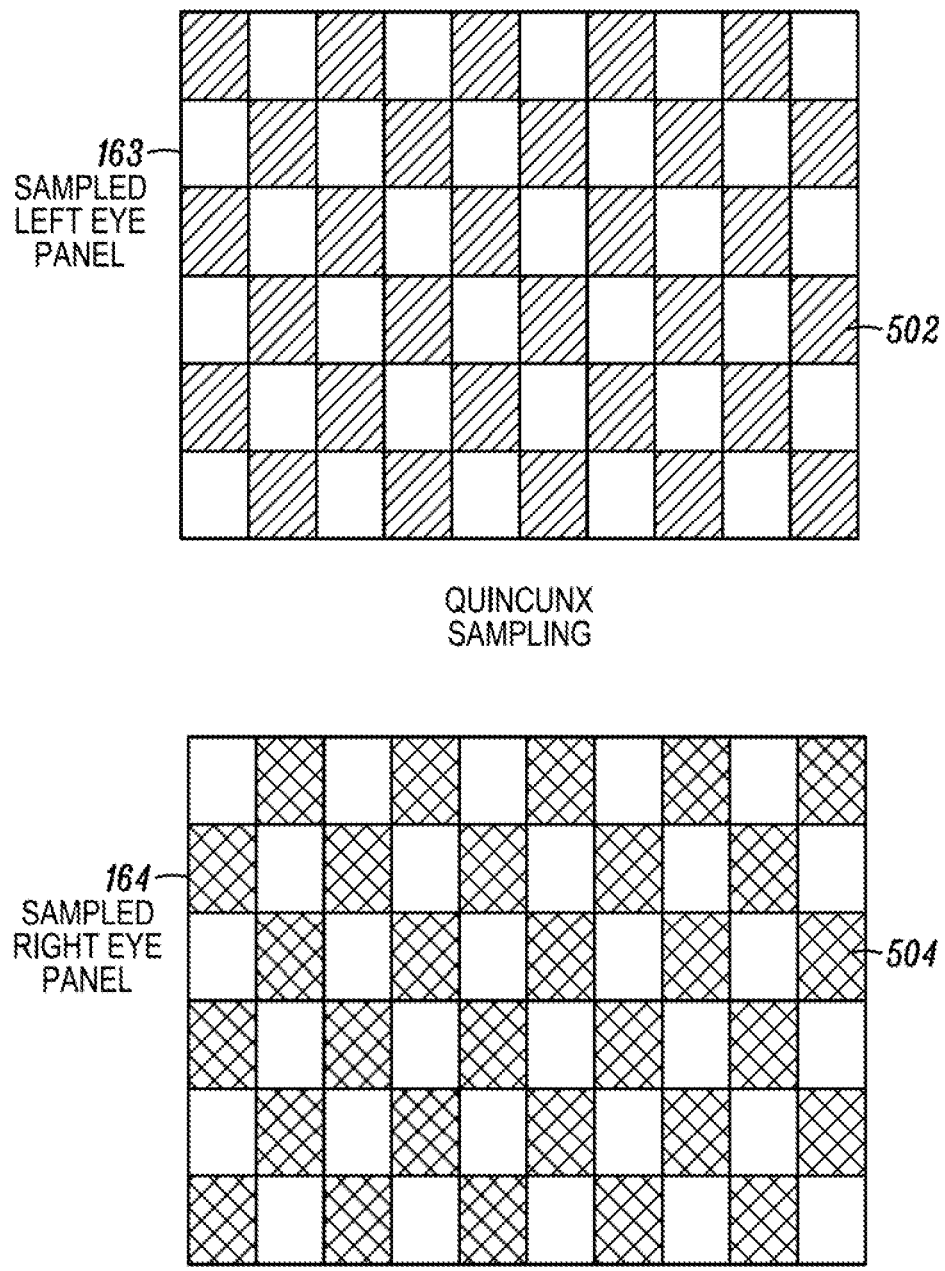
FIG. 5 is a block diagram that illustrates the format of yet another type of 3D video content that is used in connection with some embodiments of the invention.

Turning to FIGS. 2-5, different types of video formats are shown. FIG. 2 is a basic block diagram of video content 200 that is displayed in two-dimensions (2D). The image 202 is configured to be displayed on a monitor such as a 2D TV monitor in a known manner on both the x-axis and the y-axis. FIGS. 3-5 illustrate three different types of video contents 300, 400, 500 that use different formats to display video content in three-dimensions (3D) and in a known manner in the x-axis, y-axis and z-axis. FIGS. 3-5 illustrate the video content 300, 400, 500 in terms of the content that is intended for the left eye and the right eye of a viewer.

FIG. 3 illustrates 3D video content 300 that use vertical format, otherwise referred to as top and bottom format where an image 301 is configured to be displayed on a 3D monitor such as a 3D TV. For instance, the left eye view may comprise a left eye top panel 302 and the right eye view a right eye bottom panel 304 of a same video frame. Currently many commercially available 3D TVs are operable to take video formatted in this format for display in 3D.

According to another embodiment in FIG. 4, the basic stream of the video content 400 is formatted in horizontal dimension, otherwise referred to as a side-by-side left and right view (for instance, half vertical panel for each view) format. The image 401 is configured to be displayed on a 3D monitor. In the side-by-side left and right view format, the left view forms a left side panel 402 and the right eye view forms a right side panel 404 of each video frame. Currently some commercially available 3D TVs are operable to accept video content formatted in this format for display.

According to another embodiment, the basic stream of the video content 500 is formatted using in a checkerboard pattern format, known as quincunx, of left and right 3D views, as shown in FIG. 5. The checkerboard pattern format may be generated by quincunx sampling using a diamond filter for a left eye panel and a right eye panel. The diamond filter samples the left eye panel and similarly the right eye panel to form a sampled left eye panel 502 and a sampled right eye panel 504. The sampled panels are intermixed in a combined image in the checkerboard pattern. The checkerboard pattern format is spatial sequential. Currently many commercially available 3D TVs are operable to take video intermixed in this format, separate the 3D views and display in a 3D format.

Figure 6A:
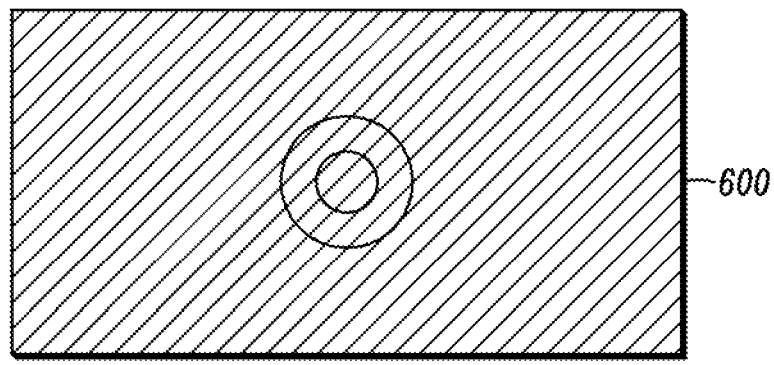
FIGS. 6a and 6b are a block diagram of decimated 2D video content to be converted into a 3D video content using one of the 3D video content formats.
Figure 6B:
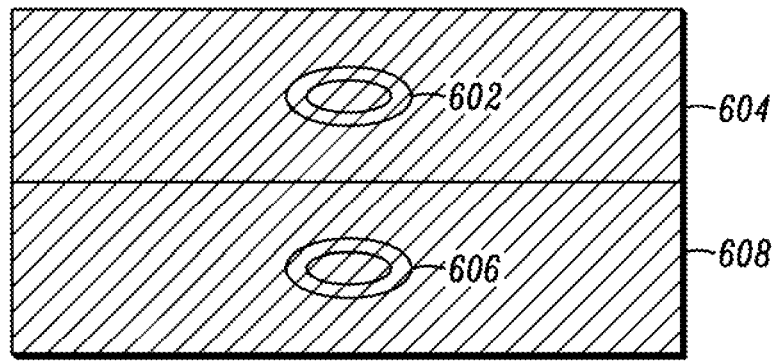

FIGS. 6a and 6b illustrate 2D video content 600, shown in FIG. 6a, that is converted into the vertical or top and bottom format shown in FIG. 3. The left eye view 602 is created from the 2D video content and is decimated vertically and inserted on the top half of the video frame 604 of a 3D video stream. The left eye view can be copied and appropriately shifted to the right eye view. In another embodiment, the right eye view 606 is also decimated vertically and inserted in the bottom half of the video frame 604 of the 3D video stream. Similarly, the 2D video content can be decimated to form horizontal or quincunx-type video frames for the 3D video stream. The methods and apparatuses to do that are described in more detail below.

As is understood from FIGS. 6a and 6b, the video frame 604, 608 will consist of two views 602, 606 that are formed in accordance with one of the 3D video formats described. The two views can be compressed using, for example MPEG-4 AVC/H.264 and set to a receiver, such as set top box (STB) or 3D TV. The STB or 3D TV receives and decodes the video, decomposes it in two views, interpolates each to full resolution and displays them. In an embodiment, a commercial that is provided in 2D video format can be inserted into a 3D video stream by decimating the 2D video stream vertically, horizontally or quincunxly into two halves of the same video frame before splicing the converted 2D video stream into the 3D video stream.

Figure 7:
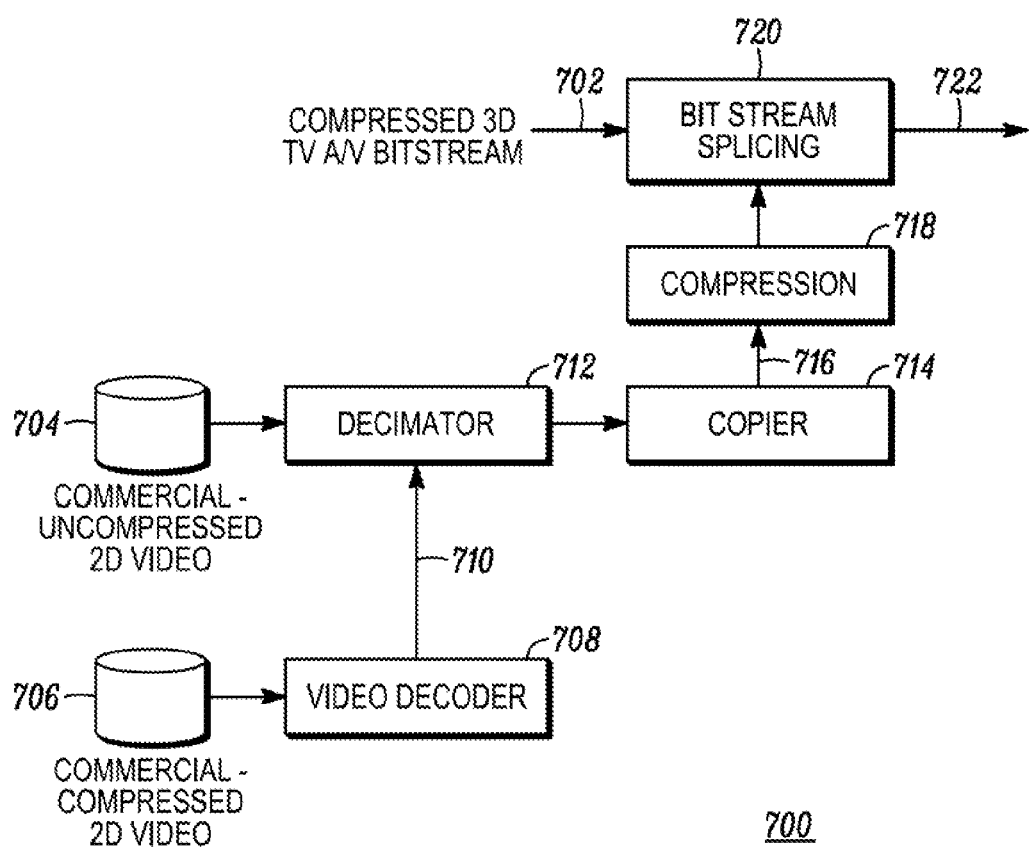
FIG. 7 is a block diagram of a system in which 2D video content is inserted into 3D video content in accordance with some embodiments of the invention.

FIG. 7 is a block diagram of a video conversion device 700 that corresponds to video conversion device 130 and that is used to convert 2D video content to be inserted into 3D video content. As understood, the video conversion device 700 can be a part of the cable head end 110. In another embodiment the video conversion device 700 can be a part of the subscriber 105a-n. In the embodiment shown, a compressed 3D video stream 702 is provided. The 3D video stream can be any of the described vertical format, horizontal format or quincunx format. Regardless of the format that is used, the format is known to the video conversion device 700. Two-dimensional video content is also provided. The 2D video content can be either uncompressed 2D video content 704 or compressed 2D video content 706. The 3D video content 702 and the 2D video content 704, 706 are received by the device 700 by a transceiver. A 2D video decoder 708 is provided that will decode the compressed 2D video content 706 so that decompressed video content 710 is outputted. The decompressed 2D video content 710 and the uncompressed 2D video content 704 are input into a 2D video content decimator 712. The 2D video content decimator takes the inputted 2D video content and formats the size or bandwidth of the 2D video content so that the 2D video content can be converted into the 3D video content format known by the device 700 that is provided by 3D audio/video bit stream 702. The decimated video content is input into a video content copier 714 that takes the reformatted size video content and repeats and offsets so that the copier 714 converts the decimated 2D video content from sources 704 and 706 into a 3D video format. The decimator 712 and the copier 714 are collectively known as a converter. The format of converted 2D video content 716 output from the copier 714 is in one of the vertical, horizontal or quincunx format that corresponds to the format of the compressed 3D video content 702. The converted 2D video content 716 is input into a compressor 718 so that it is compressed similar to compressed 3D video content 702.

A bit stream splicer 720 is provided. The compressed 3D video content 702 and the compressed converted 2D video content are input into the splicer 720. The splicer combines the two inputs into a combined 3D video content 722 that is provided from the cable head end 110 to each of the subscribers 150a-n. The splicer inserts the converted 2D video content into selected or designated locations within the 3D video content stream. Each of the subscribers that have the 3D ready TV 122 can decode the combined 3D video content and display that content in 3D to an end user.

Figure 8:
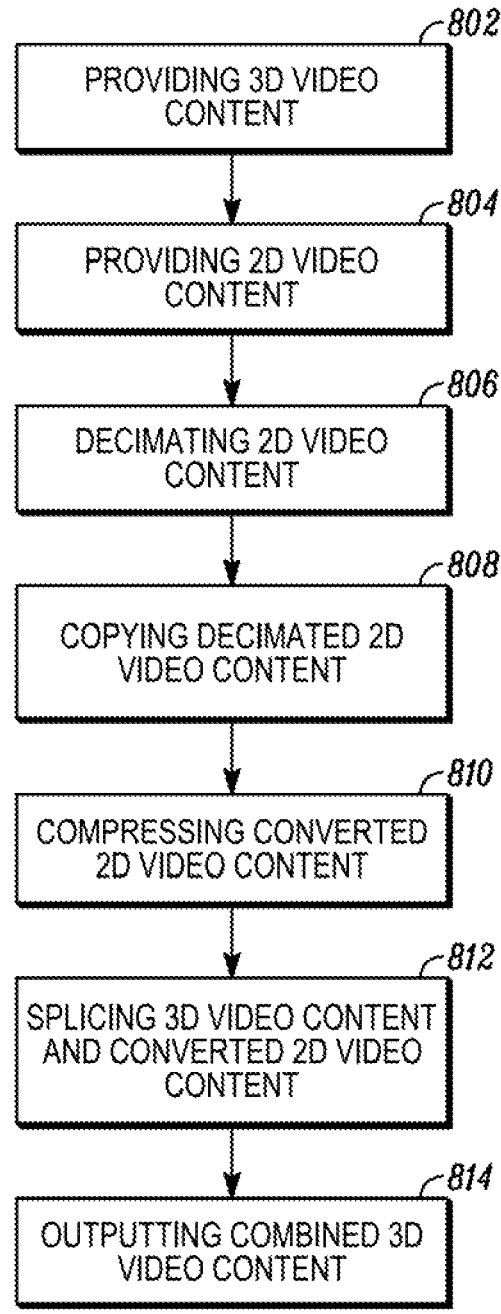
FIG. 8 is a flow chart illustrating a method of inserting 2D video content into 3D video content in accordance with some embodiments of the invention.

FIG. 8 is a flow diagram that illustrates the method that is performed by the video conversion device 700 described in FIG. 7 and that combines a 2D video content stream with a 3D video content stream so that the two video content streams can be displayed on a 3D display device such as 3D TV. The method begins by providing 802 a compressed 3D video content. The compressed 3D video content can be a 3D TV audio/video bit stream that is configured in one of a number of known formats, e.g. vertical format, horizontal format or quincunx format. In an embodiment, the 3D TV audio/video bit stream is TV programming that has been created using 3D technology. The method also includes providing 804 2D video content. The 2D video content is conventional programming and can include a 2D audio/video bit stream such as a commercial that will be inserted into the 3D audio/video bit stream. The 2D video content that is to be used by the video conversion device 700 can be either uncompressed 2D video content 704 or compressed 2D video content 706. In the case of the compressed 2D video content 706, the video decoder decompresses the content.

The 2D video content 704, 706 is provided to the decimator 712. The method continues by decimating 806 the 2D video content 704, 706 as a part of the process of converting the 2D video content into a format that can be displayed by 3D device such as a 3D TV. The decimated 2D video content is input into the video content copier 714. The decimated 2D video content is then copied 808. The combination of decimating 806 and copying 808 takes the 2D video content and formats the content into a vertical, horizontal or quincunx pattern for one of the left eye or the right eye and then repeated into the other vertical, horizontal or quincunx pattern for the other of the left or right eye. The 3D format chosen to create the converted 2D video content 716 is the known 3D format for the compressed 3D video content 702. Thus, the decimating and copying creates converted 2D video content 716 where the converted 2D video content is in a format that can be displayed with the 3D video content 702 by a 3D device such as a 3D TV.

The converted 2D video content 716 is compressed 810 by compressor so that the converted 2D video content is compressed in the same format as the compressed 3D video content. The compressed 3D video content 702 and the converted 2D video content are input into the bit stream splicer 720. The method 800 continues by splicing 812 the 3D video content 702 and the converted 2D video content 716 together to form combined 3D video content 722. The combined 3D video content is output 814 so that it can be displayed by a 3D device. In an embodiment, the 2D video content 704, 706 is a commercial that will be inserted into a 3D TV programming, e.g. 3D movie to be displayed on a 3D TV. The converted 2D video content 716 is spliced into the 3D video content at designated points within the video steam so that the combined 3D video can be output and easily displayed by the 3D TV.

Figure 9:
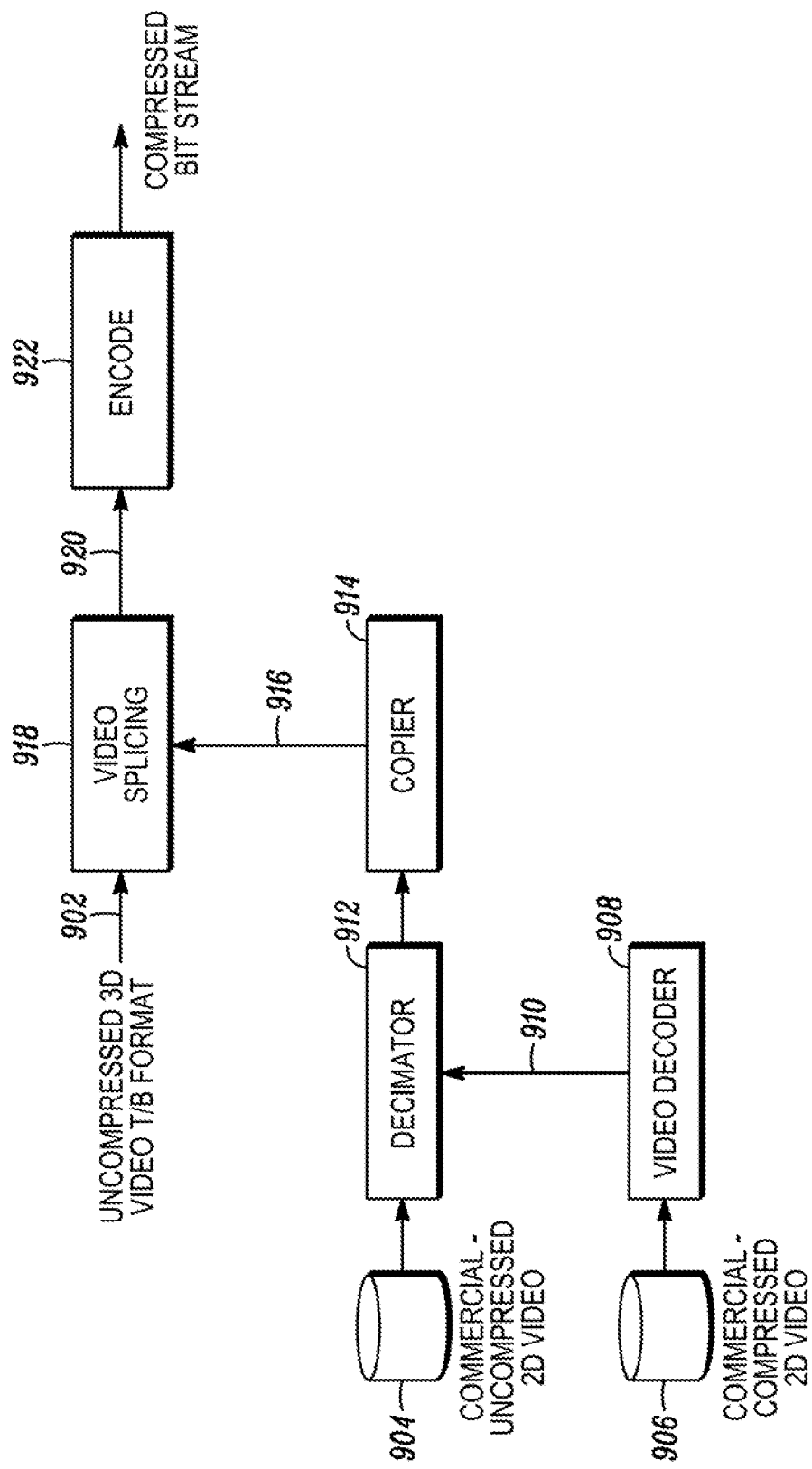
FIG. 9 is a block diagram of another system in which 2D video content is inserted into 3D video content in accordance with some embodiments of the invention.

FIG. 9 is a block diagram of another video conversion device 900 that corresponds to video conversion device 130. As understood, the video conversion device 900 can be a part of the cable head end 110 or the subscriber end 150a-n. In the embodiment shown, an uncompressed 3D video stream 902 is provided. The 3D video stream 902 can be any of the described vertical, horizontal or quincunx 3D formats. Regardless of the format that is used, the format is known to conversion device 900. Two-dimensional video content is also provided. The 2D video content can be either uncompressed 2D video content 904 or compressed 2D video content 906. The 3D video content 902 and the 2D video content 904, 906 are received by the device 900 by a transceiver. A 2D video decoder 908 is provided that will decode the compressed 2D video content 906 so that decompressed video content 910 is outputted. The decompressed 2D video content 910 and the uncompressed 2D video content 904 are input into a 2D video content decimator 912. The 2D video content decimator 912 takes the inputted 2D video content and formats the size or bandwidth of the 2D video content so that the 2D video content can be converted into the known type of 3D video content provided by 3D audio/video bit stream 902. The decimated video content is input into a video content copier 914 that takes the reformatted size video content and repeats so that the copier 914 converts the 2D video content 904, 906 into 3D video content. The format converted 2D video content 916 output from the copier 914 is in one of the vertical, horizontal or quincunx format that corresponds to the format of the 3D video content 902. The decimator 912 and the copier 914 are collectively known as a converter.

A bit stream splicer 918 is provided. The uncompressed 3D video content 902 and the converted 2D video content 916 are input into the splicer 918. The splicer combines the two inputs into a combined 3D video content 920. The combined 3D video content 920 is provided to the encoder 922 to create the combined 3D video content that is provided from the cable head end 110 to each of the subscribers 150a-n. The splicer insets the converted 2D video content into selected or designated locations within the 3D video content stream. Each of the subscribers that have the 3D ready TV 122 can decode the combined video content and display that content in 3D to an end user.

Figure 10:
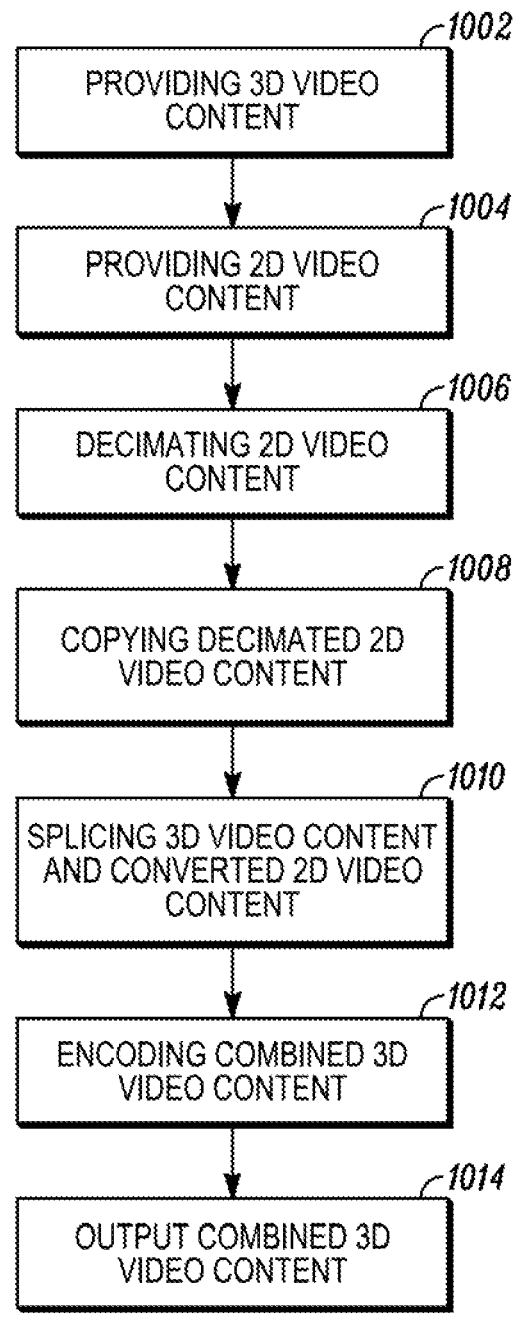
FIG. 10 is a flow chart illustrating a method of inserting 2D video content into 3D video content in accordance with some embodiments of the invention.

FIG. 10 is a flow diagram that illustrates the method that is performed by the video conversion device 900 described in FIG. 9 and that combines a 2D video content stream with a 3D video content stream so that the two video content streams can be displayed on a 3D display device such as 3DTV. The method begins by providing 1002 uncompressed 3D video content. The compressed 3D video content can be a 3D TV audio/video bit stream that is configured in one of a number of known formats, e.g. vertical format, horizontal format or quincunx format. In an embodiment, the 3D TV audio/video bit stream is TV programming that has been created using 3D technology. The method also includes providing 1004 2D video content. The 2D video content is conventional programming and can include a 2D audio/video bit stream such as a commercial that will be inserted into the 3D audio/video bit stream. The 2D video content that is to be used by the video conversion device 900 can be either uncompressed 2D video content 904 or compressed 2D video content 906. In the case of the compressed 2D video content 906, the video decoder decompresses the content.

The 2D video content 904, 906 is provided to the decimator 912. The method continues by decimating 1006 the 2D video content 904, 906 as a part of the process of converting the 2D video content into a format that can be displayed by 3D device such as a 3D TV. The decimated 2D video content is input into the video content copier 914. The decimated 2D video content is then copied 1008. The combination of decimating 1006 and copying 1008 takes the 2D video content and formats the content into a vertical, horizontal or quincunx pattern for one of the left eye or the right eye and then repeated into the other vertical, horizontal or quincunx pattern for the other of the left or right eye. The 3D format chosen to create the converted 2D video content 916 is the known 3D format for the uncompressed 3D video content 902. Thus, the decimating and copying creates converted 2D video content 916 where the converted 2D video content is in a format that can be displayed with the 3D video content 902 by a 3D device such as a 3D TV.

The 3D video content 902 and the converted 2D video content 916 are input into the bit stream splicer 918. The method 1000 continues by splicing 1010 the 3D video content 902 and the converted 2D video content 916 together to form combined 3D video content 920. The combined 3D video content 920 is then encoded 1012 by encoder 922 and is output 1014 so that it can be displayed by a 3D device. In an embodiment, the 2D video content 904, 906 is a commercial that will be inserted into a 3D TV programming, e.g. 3D movie, to be displayed on a 3D TV. The converted 2D video content 916 is spliced into the 3D video content at designated points within the video steam so that the combined 3D video can be output and easily displayed by the 3D TV.

Figure 11:
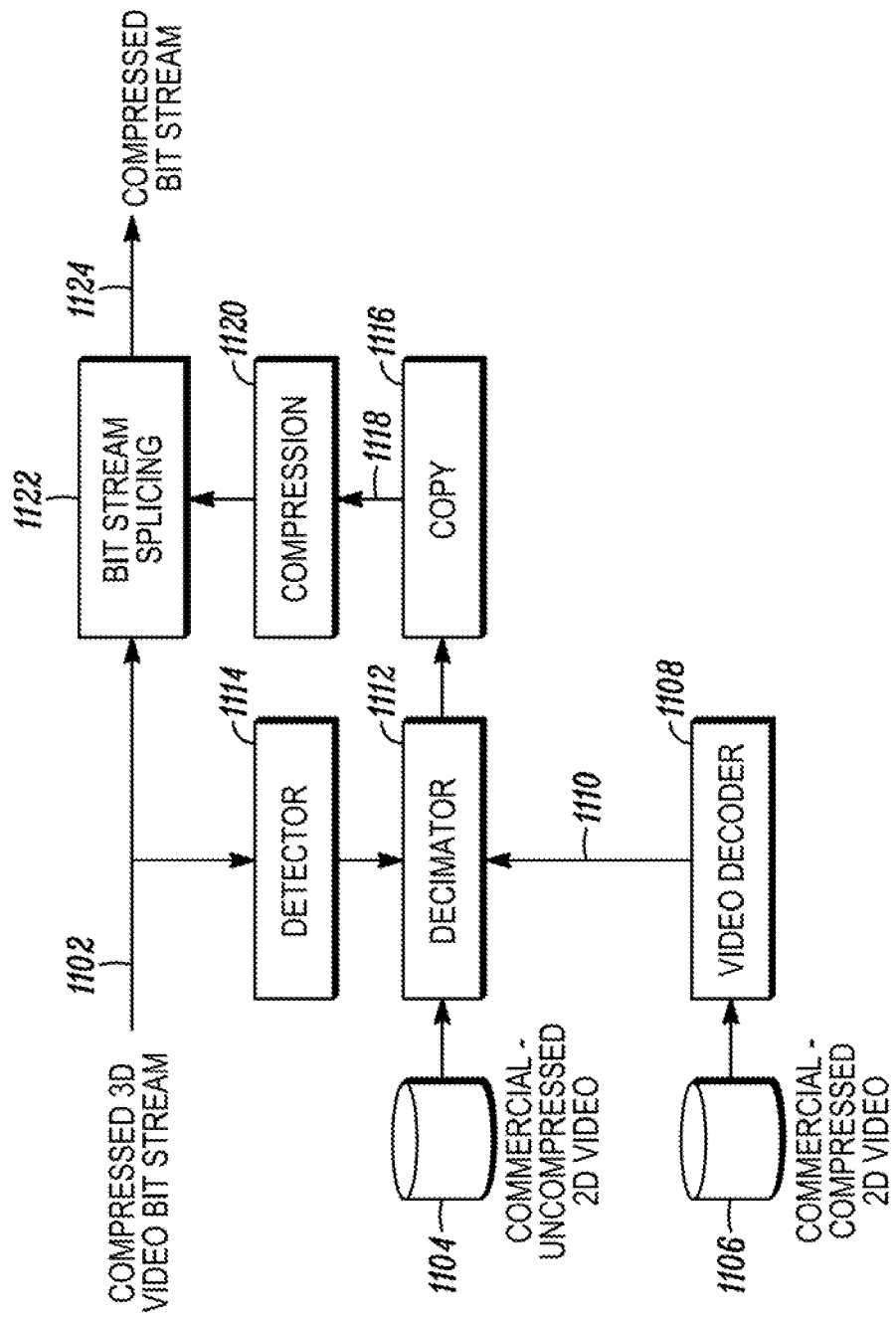
FIG. 11 is a block diagram of yet another system in which 2D video content is inserted into 3D video content in accordance with some embodiments of the invention.

FIG. 11 is a block diagram of a video conversion device 1100 that corresponds to vide conversion device 1300. As understood, the video conversion device 1100 can be a part of the cable head end 110 or collocated with a subscriber 150a-

*n*. In the embodiment shown, a compressed 3D video stream 1102 is provided. The 3D video stream 1102 can be any of the described vertical format, horizontal format or quincunx format. Two-dimensional video content is also provided. The 2D video content can be either uncompressed 2D video content 1104 or compressed 2D video content 1106. The 3D video content 1102 and the 2D video content 1104, 1106 are received by the device 1100 by a transceiver. A 2D video decoder 1108 is provided that will decode the compressed 2D video content 706 so that decompressed video content 1110 is outputted.

The decompressed 2D video content 1110 and the uncompressed 2D video content 1104 are input into a 2D video content decimator 1112. The 2D video content decimator takes the inputted 2D video content and formats the size or bandwidth of the 2D video content so that the 2D video content can be converted into the type of 3D video content provided by 3D audio/video bit stream 1102. To determine the format that the 2D video content is to be converted to, the device 1100 includes a detector 1114. The detector 1114 parses the 3D video bit stream and determines if the bit stream is formatted as vertical 3D format, horizontal 3D format or quincunx 3D format. In an embodiment, the detector parses the syntax of the 3D video content stream to look for the SEI message standardized by MPEG-4 AVC/H.264, or any other private signaling used to signal the format. The result of the detector 1114 is input to the decimator 1112 so that the decimator 1112 will convert the 2D video content in the appropriate manner to correspond with the 3D video content 1102. The decimated video content is input into a video content copier 1116 that takes the reformatted size video content and repeats and offsets so that the copier 1116 converts the 2D video content 1104 and 1106 into 3D video content 1118. The format of the converted 2D video content 1118 output from the copier 1116 is in one of the vertical, horizontal or quincunx format that corresponds to the format of the compressed 3D video content 1102 determined by the detector 1114. The converted 2D video content 1118 is input into a compressor 1120 so that it is compressed to be the same as compressed 3D video content 1102. The decimator 1112 and the copier 1114 are collectively known as a converter.

A bit stream splicer 1122 is provided. The compressed 3D video content 1102 and the compressed converted 2D video content 1118 are input into the splicer 1122. The splicer combines the two inputs into a combined 3D video content 1124 that is provided from the cable head end 110 to each of the subscribers 150*a-n*. The splicer inserts the converted 2D video content into selected or designated locations within the 3D video content. Each of the subscribers that have the 3D ready TV 122 can decode the combined video content and display that content in 3D to an end user. It is understood that the video conversion device 1100 can provide combined 3D video content 1124 when uncompressed video content is provided using the principles described in connection with the video conversion device 900.

Figure 12:
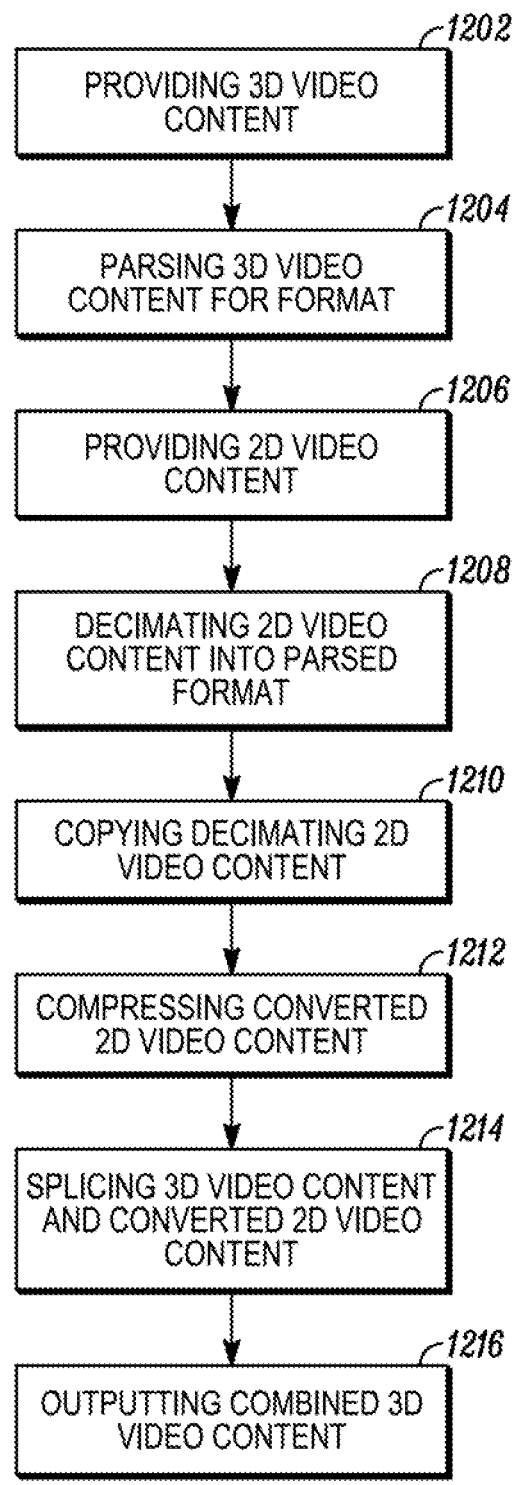
FIG. 12 is a flow chart illustrating a method of inserting 2D video content into 3D video content in accordance with some embodiments of the invention.

FIG. 12 is a flow diagram that illustrates the method that is performed by the video conversion device 1100 described in FIG. 11 and that combines a 2D video content stream with a 3D video content stream so that the two video content streams can be displayed on a 3D display device such as 3D TV. The method begins by providing 1202 a compressed 3D video content 1102. The compressed 3D video content can be a 3D TV audio/video bit stream that is configured in one of a number of known formats, e.g. vertical format, horizontal format or quincunx format. The detector 1114 parses 1204 the 3D video content 1102 to determine the 3D format of the content. The detector determines if the content 1102 is formatted as vertical 3D content, horizontal 3D content or quincunx video content. In an embodiment, the 3D TV audio/video bit stream is TV programming that has been created using 3D technology.

The method also includes providing 1206 2D video content 1104, 1106. The 2D video content is conventional programming and can include a 2D audio/video bit stream such as a commercial that will be inserted into the 3D audio/video bit stream. The 2D video content that is to be used by the video conversion device 1100 can be either uncompressed 2D video content 1104 or compressed 2D video content 1106. In the case of the compressed 2D video content 1106, the video decoder decompresses the content.

The 2D video content 1104, 1106 and the 3D video content format that is determined by detector 1114 are provided to the decimator 1112. The method continues by decimating 1208 the 2D video content 1104, 1106 as a part of the process of converting the 2D video content into a format that is determined by the detector 1114 and that can be displayed by 3D device such as a 3D TV. The decimated 2D video content is input into the video content copier 1116. The decimated 2D video content is then copied 1210. The combination of decimating 1208 and copying 1210 takes the 2D video content and formats the content into a vertical, horizontal or quincunx pattern for one of the left eye or the right eye and then repeated into the other vertical, horizontal or quincunx pattern for the other of the left or right eye. The 3D format chosen to create the converted 2D video content 1118 is the determined by detector 1114. Thus, the decimating and copying creates converted 2D video content 1118 where the converted 2D video content is in a format that can be displayed with the 3D video content 1102 by a 3D device such as a 3D TV.

The converted 2D video content 1118 is compressed 1212 by compressor so that the converted 2D video content is compressed in the same format as the compressed 3D video content. The compressed 3D video content 1102 and the converted 2D video content are input into the bit stream splicer 1120. The method 1200 continues by splicing 1214 the 3D video content 1102 and the converted 2D video content 1118 together to form combined 3D video content 1124. The combined 3D video content is output 1216 so that it can be displayed by a 3D device. In an embodiment, the 2D video content 1104, 1106 is a commercial that will be inserted into a 3D TV programming, e.g. 3D movie to be displayed on a 3D TV. The converted 2D video content 1118 is spliced into the 3D video content at designated points within the video steam so that the combined 3D video can be output and easily displayed by the 3D TV. It is understood that the method described in connection with FIG. 12 that uses compressed 3D video content can apply to uncompressed 3D video content using the principles described in connection with the method described in FIG. 10.

Figure 13:
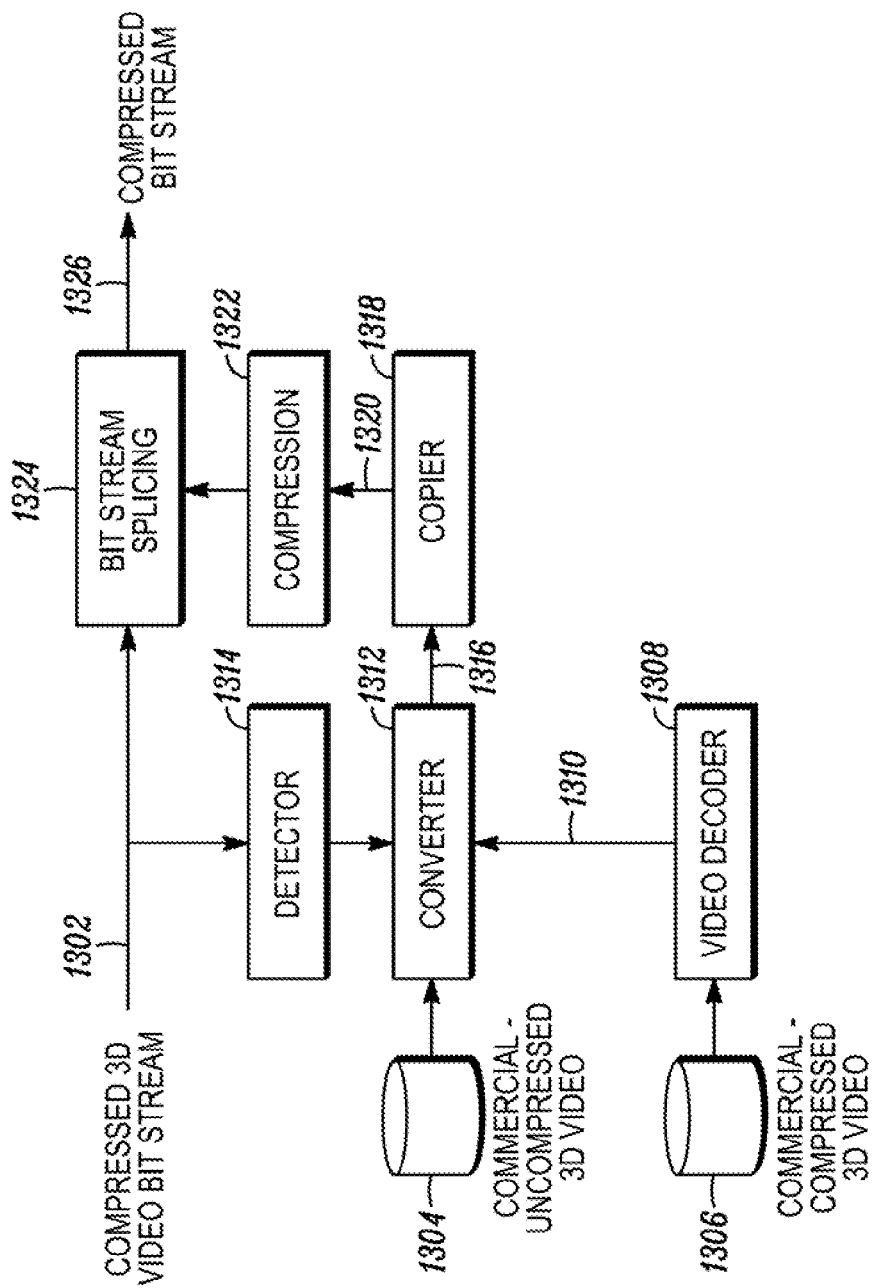
FIG. 13 is a block diagram of converting 3D video content from one 3D video format into another 3D video format in accordance with some embodiments of the invention.

FIG. 13 is a block diagram of a video conversion device 1300. As understood, the video conversion device 1300 can be a part of the cable head end 110 or collocated with subscriber 150*a-n*. In the embodiment shown, a compressed 3D video stream 1302 is provided. The 3D video stream 1102 can be any of the described vertical format, horizontal format or quincunx format. Additional 3D video content streams can also be provided. The additional 3D video content can be either uncompressed 3D video content 1304 or compressed 2D video content 1306. The 3D video content 1302, 1304, 1306 are received by the device 1300 by a transceiver. A 3D video decoder 1308 is provided that will decode the compressed 3D video content 1306 so that decompressed video content 1310 is outputted.

The decompressed 3D video content 1310 and the uncompressed 3D video content 1304 are input into a 3D video converter 1112. The 3D video converter takes the inputted 3D video content 1304, 1306 and changes the format of the 3D format so that the 3D video content 1304, 1306 can be converted into the type of 3D video content provided by 3D audio/video bit stream 1302. To determine the format of the 3D video content 1302, the device 1300 includes a detector 1314. The detector 1314 parses the 3D video bit stream 1302 and determines if the bit stream is formatted as vertical 3D format, horizontal 3D format or quincunx 3D format. The result of the detector 1314 is input to the converter 1312 so that it will convert the 3D video content 1304, 1306 in the appropriate manner to correspond with the 3D video content 1302. The converter 1312 takes the components of the 3D video content 1304, 1306 to form a decimated video content 1316 that can be converted into another 3D format. The decimated video content 1316 is input into a video content copier 1318 that takes the reformatted size video content and repeats and offsets so that the copier 1318 converts the 3D video content 1304 and 1306 into converted 3D video content 1320. The format of the converted 3D video content 1320 output from the copier 1118 is in one of the vertical, horizontal or quincunx format that corresponds to the format of the compressed 3D video content 1302 determined by the detector 1314.

For example, the detector 1314 determines that the 3D video content 1302 utilizes a horizontal 3D format. In the other hand, the 3D video content 1304, 1306 is in a vertical 3D format. For the 3D video content 1304, 1306 to be inserted into the 3D video content 1302, both 3D video streams should use the same format. Thus, the converter 1312 manipulates the 3D video content 1304, 1306 such that all the components form both halves of the vertical format are retained and all those components are decimated so that they can be copied by copier 1318 into the horizontal 3D format.

The converted 3D video content 1320 is input into a compressor 1322 so that it is compressed to be the same as compressed 3D video content 1302.

A bit stream splicer 1324 is provided. The compressed 3D video content 1302 and the compressed converted 2D video content are input into the splicer 1324. The splicer combines the two inputs into a combined 3D video content 1326 that is provided from the cable head end 110 to each of the subscribers 150a-n. Each of the subscribers that have the 3D ready TV 122 can decode the combined 3D video content and display that content in 3D to an end user. It is understood that the video conversion device 1100 can provide combined 3D video content 1326 when uncompressed 3D video content is provided using the principles described above.

Figure 14:
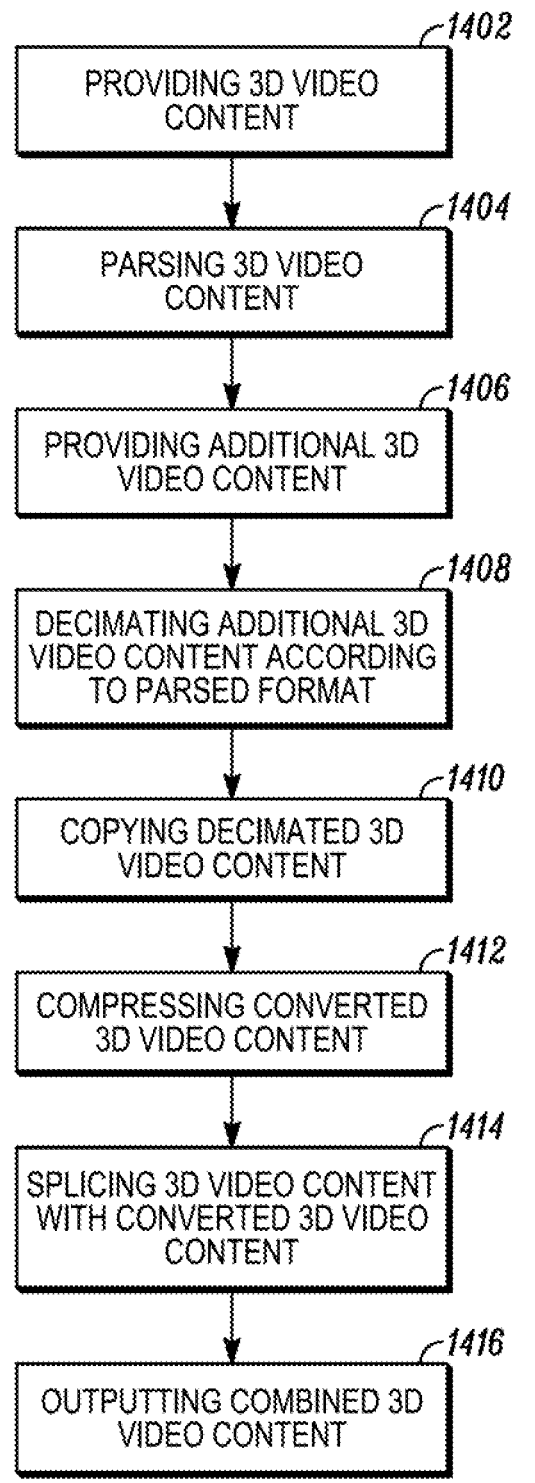
FIG. 14 is a flow chart illustrating a method of inserting 3D video content having one type of format into 3D video content that has a different format in accordance with some embodiments of the invention.

FIG. 14 is a flow diagram that illustrates the method that is performed by the video conversion device described in FIG. 11 and that combines a 3D video content stream of created using one 3D format with a 3D video content stream that uses another 3D format so that the two video content streams can be displayed on a 3D TV. The method begins by providing 1402 a compressed 3D video content 1302. The compressed 3D video content can be a 3D TV audio/video bit stream that is configured in one of a number of known formats, e.g. vertical format, horizontal format or quincunx format. The detector 1314 parses 1404 the 3D video content 1302 to determine the 3D format of the content. The detector determines if the content 1302 is formatted as vertical 3D content, horizontal 3D content or quincunx video content.

The method also includes providing 1406 additional 3D video content 1304, 1306.

The additional 3D video content that is to be used by the video conversion device 1300 can be either uncompressed 3D video content 1304 or compressed 3D video content 1306. In the case of the compressed 3D video content 1306, the video decoder decompresses the content.

The additional 3D video content 1304, 1306 and the 3D video content 1302 format that is determined by detector 1314 are provided to the decimator 1312. The method continues by decimating 1408 the 3D video content 1304, 1306 as a part of the process of converting the 3D video content into the 3D format that is determined by the detector 1314. The decimated 3D video content 1316 is input into the video content copier 1318. The decimated 3D video content 1316 is then copied 1410. The combination of decimating 1408 and copying 1410 takes the additional 3D video content, formats the content into a vertical, horizontal or quincunx pattern for one of the left eye or the right eye and then repeated into the other vertical, horizontal or quincunx pattern for the other of the left or right eye. The 3D format chosen to convert the converted 3D video content 1320 is the determined by detector 1314. Thus, the decimating and copying creates converted 3D video content 1320 where the converted 3D video content is in a format that can be displayed with the 3D video content 1302 by a 3D device such as a 3D TV.

The converted 3D video content 1320 is compressed 1412 by compressor 1322 so that the converted 3D video content is compressed in the same manner as the compressed 3D video content 1302. The compressed 3D video content 1302 and the converted 3D video content 1320 are input into the bit stream splicer 1324. The method 1400 continues by splicing 1414 the 3D video content 1302 and the converted 3D video content 1320 together to form combined 3D video content 1326. The combined 3D video content 1326 is output 1416 so that it can be displayed by a 3D device. In an embodiment, the additional 3D video content 1304, 1306 is a commercial that will be inserted into a 3D TV programming, e.g. 3D movie to be displayed on a 3D TV. The converted 3D video content 1320 is spliced into the 3D video content at designated points within the video steam so that the combined 3D video can be output and easily displayed by the 3D TV.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method comprising:
    determining a first format of a first stream of video content including a first frame followed immediately by a second frame and a third frame followed immediately by a fourth frame, wherein the first frame and the second frame correspond to a first view of the first stream of video content, and wherein the third frame and fourth frame correspond to a second view of the first stream of video content;

determining a second format of a second stream of video content, wherein the second stream of video content comprises a fifth frame;

converting the second stream of video content into a converted second stream of video content using the first format, wherein the converted second stream of video content comprises a sixth frame and a seventh frame that are converted from the fifth frame;

combining the first stream of video content with the converted second stream of video content to form a combined stream of video content, wherein combining the first stream of video content with the converted second stream of video content comprises:

splicing the sixth frame between the first frame and the second frame of the first stream of video content; and splicing the seventh frame between the third frame and the fourth frame of the first stream of video content; and decoding the combined stream of video content.

2. The method of claim 1 wherein the first stream of video content comprises three-dimensional (3D) video content.

3. The method of claim 2 wherein the first format is one of vertical 3D format, horizontal 3D format and quincunx 3D format.

4. The method of claim 1 wherein the second stream of video content comprises two-dimensional (2D) video content.

5. The method of claim 1 wherein the second stream of video content is two-dimensional (2D) video content and converting the second stream of video content comprises converting the 2D video content into one of vertical resolution three-dimensional (3D) video content, horizontal resolution video content and quincunx resolution 3D video content.

6. A method comprising:

providing three-dimensional (3D) video content using a determined format, the 3D video content including a first frame followed immediately by a second frame and a third frame followed immediately by a fourth frame, wherein the first frame and the second frame correspond to a first view of the 3D video content, and wherein the third frame and fourth frame correspond to a second view of the 3D video content;

providing two-dimensional (2D) video content, wherein the 2D video content comprises a fifth frame;

converting the 2D video content into converted 3D video content using the determined format, wherein the converted 3D video content comprises a sixth frame and a seventh frame that are converted from the fifth frame;

combining the converted 3D video with the 3D video content to form a combined 3D video content, wherein combining the 3D video content with the converted 3D video content comprises:

splicing the sixth frame between the first frame and the second frame of the 3D video content; and splicing the seventh frame between the third frame and the fourth frame of the 3D video content; and decoding the combined 3D video content.

7. The method of claim 6 wherein the determined format being one of horizontal 3D format, vertical 3D format and quincunx 3D format.

8. The method of claim 6 further comprising transmitting the converted 3D video content.

9. The method of claim 6 wherein inserting the converted 3D video content is performed by a 3D video content transmitter.

10. The method of claim 6 wherein inserting the converted 3D video content is performed by a 3D video content receiver.

11. The method of claim 6 further comprising compression of the combined 3D video content.

12. An apparatus comprising:

a transceiver for transceiving at least one of three-dimensional (3D) video content and two-dimensional (2D) video content;

a detector for determining a format of the 3D video content including a first frame followed immediately by a second frame and a third frame followed immediately by a fourth frame, wherein the first frame and the second frame correspond to a first view of the 3D video content, and wherein the third frame and fourth frame correspond to a second view of the 3D video content;

a converter for converting the 2D video content into converted 3D video content using the determined format of the 3D video content, wherein the converted 3D video content comprises a sixth frame and a seventh frame that are converted from a fifth frame of the 2D video content; and a splicer for combining the 3D video content with the converted 3D video content, wherein the splicer is configured to:

splice the sixth frame between the first frame and the second frame of the 3D video content; and splice the seventh frame between the third frame and the fourth frame of the 3D video content.

13. The apparatus of claim 12 wherein the converter and the splicer are coupled to the transmitter.

14. The apparatus of claim 12 wherein the converter and the splicer are connected to the receiver.

15. The apparatus of claim 12 wherein the format of 3D video content being one of horizontal 3D video format, vertical 3D video content and quincunx 3D video format.

16. The apparatus of claim 12 further comprising a compressor to compress the 3D video content for transmission.

17. The apparatus of claim 12 further comprising a decoder to decode the converted 3D video content.

* * * * *